United States Patent [19]

Strub et al.

[11] 3,927,763
[45] Dec. 23, 1975

[54] INSTALLATION UNIT FOR A MULTISTAGE RADIAL COMPRESSOR

[75] Inventors: Rene Strub; John Peter Naegeli, both of Winterthur, Switzerland

[73] Assignee: Brown Boveri - Sulzer Turbomachinery Ltd., Zurich, Switzerland

[22] Filed: Aug. 20, 1973

[21] Appl. No.: 389,443

Related U.S. Application Data

[63] Continuation of Ser. No. 207,308, Dec. 13, 1971, abandoned.

[30] Foreign Application Priority Data

Dec. 15, 1970 Switzerland.................. 18548/70

[52] U.S. Cl. ............ 206/319; 415/199 A; 415/108; 417/360
[51] Int. Cl.²......................................... B65D 85/68
[58] Field of Search ........... 206/319, 318, 304, 303; 415/108, 199 A; 417/360; 277/11; 267/135

[56] References Cited
UNITED STATES PATENTS

| | | |
|---|---|---|
| 1,837,873 | 12/1931 | Macmeeken........................ 415/108 |
| 1,935,538 | 11/1933 | Baumann........................... 417/360 |
| 2,645,258 | 7/1953 | Blakeley............................ 206/318 |
| 2,692,152 | 10/1954 | Tremolada......................... 206/303 |
| 2,950,002 | 8/1960 | Eastburg............................ 206/318 |
| 3,198,323 | 8/1965 | Alberti et al........................ 277/11 |
| 3,547,258 | 12/1970 | Black................................ 206/304 |
| 3,670,873 | 6/1972 | Dwyer, Jr. ......................... 267/135 |

*Primary Examiner*—William T. Dixson, Jr.
*Attorney, Agent, or Firm*—Kenyon & Kenyon Reilly Carr & Chapin

[57] ABSTRACT

The shaft, rotors, diffusors, deflectors, covers and related bearings and seals are all secured together as a unit so as to be easily handled without impairment of the labyrinth seals between the rotors and diffusors during assembly in a compressor casing. These components are held together by means of supports which are fixed to the ends of the shaft and abut the respective covers.

10 Claims, 1 Drawing Figure

U.S. Patent   Dec. 23, 1975   3,927,763
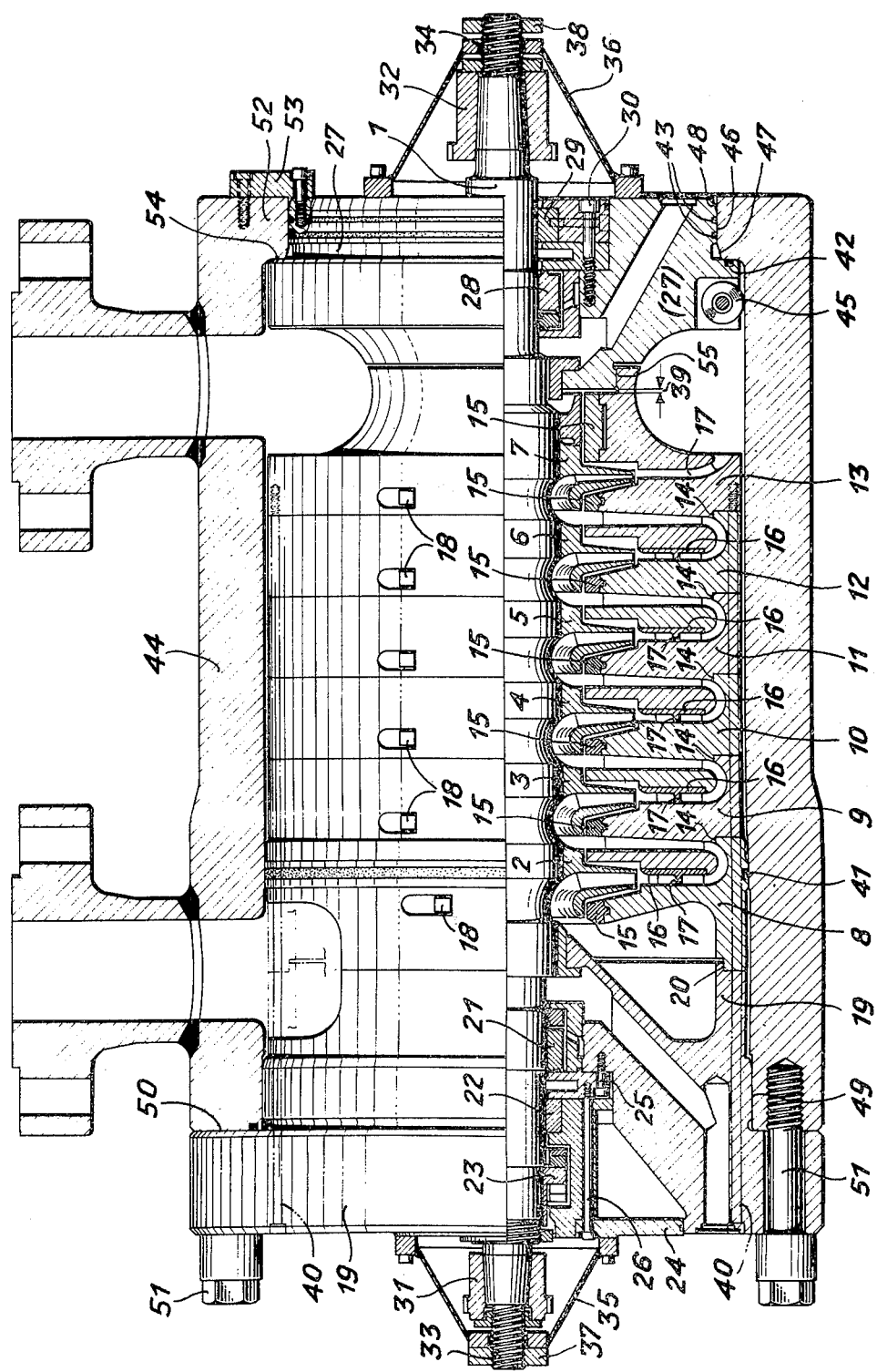

INSTALLATION UNIT FOR A MULTISTAGE RADIAL COMPRESSOR

This is a continuation of patent application Ser. No. 207,308 filed Dec. 13, 1971 now abandoned.

This invention relates to an installation unit for a multistage radial compressor for high pressures, and particularly, for an axial type unsplit cylindrical casing in which a shaft is horizontally positioned.

The assembly of multistage radial pumps or radial compressors is generally difficult as annular diffusors and deflectors have to be installed between the individual rotors on a shaft. As a result, it has been necessary either to make use of split annular diffusors and deflectors which can be pushed on the shaft with the rotors already between them, or else to make use of axially-split annular diffusors and deflectors which, after the rotors have been pushed on the shaft, are mounted by setting each respective half between each pair of rotors and thereafter connecting the halves together by bolts. The deflectors which have been mounted between the rotors in these manners can, however, bear against the rotors before installation in a casing through the seals usually mounted therebetween in opposition to the shaft. Thus, when such a structural unit is introduced into the casing, the seal is subjected to the risk of becoming damaged because of the bearing of the deflector against the rotors.

Further, after mounting of the unit, caps or covers have to be mounted on both ends of the shaft and fastened to the casing. Finally, stuffing-box housings must be pushed into recesses at both ends of the casing and fastened thereto. It is only now that the rotors inside the deflectors have a precise central position, so that the seals between them are no longer in contact with them. Therefore, during the entire installation operation, a serious danger exists for the mechanically sensitive parts of the seals, for example, the labyrinth-type contactless seal bushings between the rotating and the stationary parts at the shaft ends, or between the individual stages. This is because theses seals have to be brought into the place provided therefor along with heavy structural elements mounted in other heavy structural elements, with only a slight clearance that is just enough to ensure sealing and without exact guidance. A further difficulty, in the case of such an installation, is the fact that the easily-damaged parts, for example, the labyrinth seals, are fixedly secured to structural parts of much greater weight than that of the sealing element. Also, these parts have usually been mounted within the casing and, thus, cannot be checked for damage before the assembly is completed.

Accordingly, it is an object of this invention to facilitate and shorten the time of assembly of a radial compressor.

It is another object of the invention to secure the rotors, diffusors and deflectors of a radial compressor together within a structural unit which can be installed in a casing without damaging the seals between the rotors and deflectors.

Briefly, the invention provides an installation unit which comprises a shaft, rotors, annular diffusors, deflectors, a high-pressure cover together with a stuffing-box and a bearing, and a low-pressure cover with a stuffing-box and a bearing. Such a unit can be assembled outside an engine casing, preferably by the aid of accurately gauged supports, as a coherent structural part. The individual parts of the unit, particularly the stationary and mobile parts of the shaft seals, after being drawn together by the aid of the shaft, are fastened and locked in their positions relative to one another. The unit can, therefore, be transported easily and without damage, for greater or small distances independently of the casing. The unit can also be easily introduced, from the low-pressure side, into a leakproof pot-like compressor casing, in such a way that the high-pressure cover forms an autoclave seal against an inner flange at one end of the casing while the low-pressure cover having a flange-seal comes to bear against the opposite end of the casing. After the introduction of the installation unit into the casing, and the fastening of the low-pressure cover to the casing, the parts used to pull the unit together can be removed, so that the engine is ready for its assigned use.

In order to obtain a leakproof sealing of the fixed parts of the unit against the casing, various seals may be applied prior to their introduction into the unit. Thus, for example, the low-pressure cover may have a seal disposed against an annular surface, or the high-pressure cover may have a seal disposed against its supporting surface or against a cylindrical recess, or the unit may have a peripheral seal in the region of each deflector, which after installation of the unit, comes to bear against a corresponding counter-surface of the casing.

The deflectors may be made split in the axial plane, and the two halves may be clamped together by means of bolts disposed outside the deflectors. The annular diffusors may be inserted into the deflectors, or be inserted between each two deflectors. The deflectors may, however, also be combined as a coherent structural part into at least one unit. It is advantageous to facilitate assembly of the installation unit, to make such a structural part split along the axial plane.

In order to secure the parts of the installation unit together by means of the shaft, supporting stands or supporters are mounted on respective ends of the shaft and abut the parts which are not fastened to the shaft and holds them together, ensuring a precise central location.

These and other objects and advantages of the invention will become more apparent from the following detailed description and appended claims taken in conjunction with the accompanying drawings in which:

The drawing illustrates a part cross-sectional view of an installation unit according to the invention inserted within a casing.

Referring to the drawing, the installation unit has a shaft 1 which is provided with six sequent compressor stage rotors 2 to 7 which are mounted in abutment with each other.

These rotors 2 to 7 may be press-fitted upon the shaft, be tightened up on the shaft 1, or be splined to the shaft 1. Deflectors 8 to 13 are disposed in front of, between, and following the rotors 2 to 7 and are centered relative to one another in each case by shoulders 14. The deflectors 8 to 13 have labyrinth-type seals 15 which are disposed at locations opposite a corresponding sealing surface of a rotor 2 to 7 thus sealing off the adjacent spaces of sequent rotors from one another. The deflectors 8 to 12 are provided with recesses in which diffusor rings 16 are inserted to effect a low-loss conversion of dynamic energy into pressure energy. The diffusor rings 16 and also the last deflector 13 have lead-back vanes 17 which determine a suitable peripheral component of the deflected flow. The deflectors 8 to 13 are split axially into two segments, each two of which are clamped together by means of countersunk screws 18 to form a complete ring.

A low-pressure cover 19 is disposed at the one side of the unit and includes a centering ring 20 thereon which fits into the set of deflectors 8 to 13. In addition, the cover 19 has a central recess which encloses a stuffing box 21, a radial bearing 22, and a thrust bearing 23 as are known. All the parts inserted into the recess, together with an annular cover 24, are clamped to the cover 19 by screws 25 and 26 as shown. A high-pressure cover 27 is disposed at the other side of the unit and includes a central recess in which a high-pressure stuffing-box 28 and a radial bearing 29 are disposed. A screw 30 clamps these elements against the cover 27. The cover 27 also has a centering surface 55 which fits into the set of deflectors 8 to 13.

Each end of the shaft 1 has a conical section on which a clutch-half 31 and 32 is respectively mounted as well as a threaded end 33, 34 on which a nut is threaded to clamp the clutch halves 31, 32 tightly on the shaft 1. These threaded ends 33, 34 also serve to tighten up and hold together the individual parts of the unit: 2 to 13, 16, 19, 21 to 23, 24, 27, 28 and 29. For this purpose, supportors 35, 36 respectively are fastened centrally to the two covers 19, 27 and are pressed against the covers 19, 27 by means of nuts 37, 38, respectively on the shaft ends 33, 34. In this way, the thrust-bearing comb is relieved of load, and the clearance 39 between the last deflector 13 and the high-pressure cover 27 vanishes.

Referring to FIG. 1, tightening of the nuts 37, 38 on the shaft 1 causes the supportors 35, 36 to be pressed against the covers 19, 27. In this way, the shaft 1 is placed under tension while the covers 19, 27, deflectors 8 to 13 and diffusor rings 16 are placed under compression.

It is evident that all the parts of the installation unit are, by the aid of the centering shoulders 14 and of the centering ring 20 and surface 55, fastened together with the radial bearings 22 and 29 and the shaft 1 immovably disposed in a central position. Thus, the easily-damaged seals 15 in the deflectors 8 to 13 are protected from resting against the counter-surfaces of the rotors 2 to 7.

The clamped together unit can be transported without danger of damage for any distance. In particular, however, the assembling of the unit can be done comfortably and in full view outside the casing, for example, on a suitable gaging support that is easily accessible from all sides, so that even during assembly, the danger of damaging the seals is eliminated.

In order to hold the deflectors 8 to 13 together axially in the low-pressure cover 19, and also later on during operation, threaded rods 40 which are disposed to pass through the deflectors 8 to 13 and cover 19 are tightened up during the assembly of the unit. Also, during assembly, a seal 41 may, for example, be inserted in the first deflector 8 for subsequently sealing the high-pressure space of the compressor from the low-pressure space during operation. Finally, seals can also be installed in the high-pressure cover 27. For example, a seal 42 is inserted in the axial seating surface and a seal 43 is inserted in the radial seating surface of the high-pressure cover 27.

The clamped-together unit can be introduced as such into a suitable casing 44 as is known. For this purpose, the unit has a number of rollers 45 at the periphery which guide the unit along the inner wall of the casing 44 before a centering surface 46 on the cover 27 enters a corresponding centering surface in the casing 44. Bevels 47, 48 are also provided on the casing 44 and cover 27 to take over the final guidance so as to guide the unit linearly at the high-pressure side into the centering surface 46 of the casing 44. The low-pressure end of the casing 44 has a centering surface 49 which serves to take over the guidance of the unit at the low-pressure side at the same time.

After placement, the unit rests by the outer flange of the low-pressure cover 19 against the casing end 50. The unit is then clamped by the aid of cover screws 51 which pass through the cover 19 into the casing 44. The high-pressure cover 27 is, however, still at a slight spacing from the inner flange 52 at the high-pressure side of the casing 44. Thus, after the nut 38 is loosened, the cover 27 can, by the aid of fittings 53, be pulled against the surface 54 of the flange 52 so as to act as an autoclave seal while restoring the clearance 39 between the deflector 13 and cover 27. Thereafter, the compressor is made ready for operation, and the nuts 37 and 38 and also the supporters 35 and 36 may be removed.

According to the invention, the shaft of the installation unit is placed under tension. As a result, the vibration frequency of the shaft is increased and thus is placed further away from the low-frequency region of the influences generally imposed upon the unit during transport (e.g. as with a stretched string of a musical instrument). In addition, the sag of the shaft due to its own weight is decreased. Further, since the shaft is placed under tension, the deflectors and covers are placed under compression. In this way, the vibration frequency of the deflectors and the covers also is increased and the sag reduced.

As is well known, seals are generally required from stage-to-stage of a radial compressor between the rotor and the stator to prevent internal circulation of the gas to be compressed. In the case of compressors, such seals cannot be made in a similar fashion as may be the case in pumps for fluids. In the case of a compressor, particularly those of high performance, use is almost always made of non-contact seals having throttle chambers such as labyrinth seals. However, because of their structure, the seals are very sensitive to impact forces. Thus, during installation and transport, there is a high degree of danger that these seals can become damaged by contact with the shaft. According to the invention, this danger is substantially decreased because the sag in the shaft as well as in the deflectors is substantially reduced. Further, any vibration or disturbances which might occur during transport and installation are prevented from exciting a vibration in the shaft.

A further advantage of the invention is that the installation unit can be assembled in a clean workshop rather than in a dirty construction site environment.

The decrease of sag and the increase of vibration frequency of the installation unit has an end result of effecting a substantially increased reliability of the shaft seals between the individual compressors.

What is claimed is:

1. An installation unit for introduction into a casing of a multistage radial compressor comprising
a shaft,
a plurality of rotors mounted on said shaft,
a plurality of annular deflectors disposed about said shaft,
sealing means mounted in deflectors about said shaft, a plurality of annular diffusors, each diffusor mounted in a respective deflector, a high pressure cover disposed against said deflectors at an inner side thereof, a bearing in said cover for rotatably supporting said shaft in said cover and centrally within said bearing, a stuffing box in said cover for sealing said shaft relative to said cover, a low pressure cover disposed against said deflectors at an opposite side thereof, a bearing in said low pressure cover for rotatably supporting said shaft therein and centrally within said latter bearing, a stuffing box in said low pressure cover for sealing said shaft relative to said low pressure cover, and means removably mounted on said covers and said shaft for clamping said covers and said deflectors together and for clamping said shaft to said covers and said deflectors to prevent relative rotation between said shaft, said covers and said deflectors whereby said deflectors are pressed together and said shaft is placed under tension while being held centrally within said sealing means.

2. An installation unit as set forth in claim 1 wherein said annular diffusors are inserted into said deflectors.

3. An installation unit as set forth in claim 1 wherein said annular diffusors are disposed between each two deflectors.

4. An installation unit as set forth in claim 1 at least one group of said deflectors is made as a coherent structural part.

5. An installation unit as set forth in claim 1 wherein said coherent deflector structural part is split in the axial plane.

6. An installation unit as set forth in claim 1 wherein said means includes a supporter fixed to each end of said shaft and abutting said respective cover thereat.

7. The combination of a cylindrical casing having an inner flange at a high pressure end thereof and an opening at an opposite low pressure end; and an installation unit mounted in said casing and having a shaft centered relative to said casing, a plurality of rotors mounted on said shaft, a plurality of annular deflectors disposed about said shaft, a plurality of annular diffusors, each diffusor mounted on a respective deflector, a high pressure cover disposed against said deflectors at said high pressure end, a bearing in said cover for rotatably supporting said shaft therein, a stuffing box in said cover for sealing said shaft relative to said cover, an annular seal between said cover and said inner flange, a low pressure cover disposed against said deflectors at said opposite low pressure end, a bearing in said low pressure cover for rotatably supporting said shaft therein, a stuffing box in said low pressure cover for sealing said shaft relative to said low pressure cover and means clamping said covers and said deflectors together and to said shaft for preventing relative rotation therebetween; wherein said high pressure cover bears against said inner flange and forms an autoclave seal after mounting of said unit in said casing and pulling of said high pressure cover against said inner flange and said low pressure cover bears against the opposite end of said casing and forms a flange seal.

8. The combination as set forth in claim 7 wherein said high pressure cover has a cylindrical shoulder concentrically within said flange of said casing and which further includes a seal positioned in sealing relation between said shoulder and said flange.

9. The combination as set forth in claim 7 which further includes an annular seal disposed in sealing relation about at least one of said deflectors and said casing.

10. The combination as set forth in claim 7 wherein said high pressure cover includes at least one roller rotatably mounted therein and rollably resting on an inner surface of said casing for guiding said unit during installation in said casing.

* * * * *